United States Patent [19]

Sitabkhan

[11] 4,281,892
[45] Aug. 4, 1981

[54] FIBER OPTIC CONNECTOR

[75] Inventor: Mansur N. Sitabkhan, Brecksville, Ohio

[73] Assignee: International Telephone and Telegraph Corporation, New York, N.Y.

[21] Appl. No.: 61,057

[22] Filed: Jul. 26, 1979

[51] Int. Cl.³ .............................................. G02B 5/14
[52] U.S. Cl. ................................................ 350/96.21
[58] Field of Search ........................... 350/96.21, 96.22

[56] References Cited

U.S. PATENT DOCUMENTS

| 3,885,859 | 5/1975 | Dalgleish et al. | 350/96.21 |
| 4,030,809 | 6/1977 | Onishi et al. | 350/96.21 |
| 4,045,121 | 8/1977 | Clark | 350/96.21 |
| 4,146,299 | 3/1979 | Wellington et al. | 350/96.21 |
| 4,181,401 | 1/1980 | Jensen | 350/96.21 |

FOREIGN PATENT DOCUMENTS

| 1117 | 3/1979 | European Pat. Off. | 350/96.21 |
| 2722601 | 12/1977 | Fed. Rep. of Germany | 350/96.21 |
| 2811404 | 9/1978 | Fed. Rep. of Germany | 350/96.21 |

Primary Examiner—Stewart J. Levy

[57] ABSTRACT

An actuated fiber optic connector is disclosed in which the plug and receptacle connector members are axially mated with the fiber optic ferrule in the plug connector member sliding into a V-shaped channel in the receptacle connector member with zero insertion force to abut the receptacle fiber optic ferrule therein. A leaf spring is mounted in the channel. An axially slidable actuating sleeve is mounted on the plug connector member. When the connector members are mated, the sleeve engages a radially shiftable plunger in the receptacle, forcing the plunger inwardly to automatically urge the spring, and thus the ferrules, into the V-channel thereby precisely laterally aligning the optical fibers in the ferrules.

5 Claims, 2 Drawing Figures

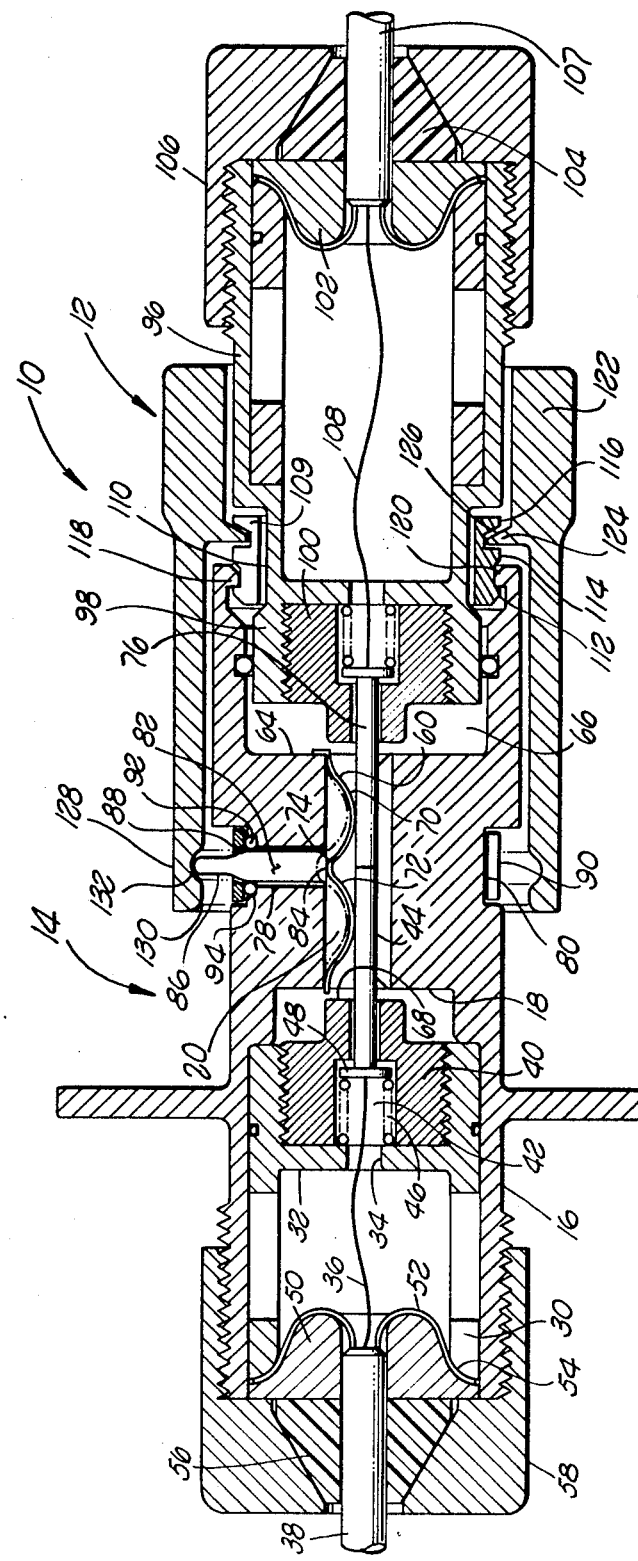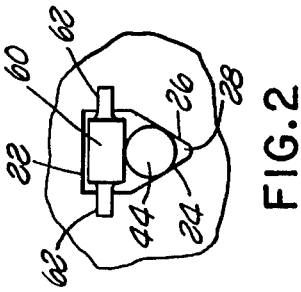
FIG. 1
FIG. 2

FIBER OPTIC CONNECTOR

BACKGROUND OF THE INVENTION

The present invention relates generally to a fiber optic connector and, more particularly, to an actuated fiber optic connector.

Some fiber optic connectors are constructed in such a manner that when the mating connector halves of the connectors are interengaged, the optical fibers, or optical fiber ferrules therein, are aligned without further operations. An example of such a non-actuated connector is one in which the optical fiber ferrules are aligned by being pushed into the opposite ends of a precisely machined cylindrical guide sleeve. However, because of the close sliding fit of the ferrules in the guide sleeve, insertion forces are encountered in mating the connector halves, particularly for multi-channel connectors. Another well known means for aligning optical fiber ferrules is the use of a V-groove in which the ferrules are initially inserted with zero insertion force and thereafter are pushed into the bottom of the groove by a suitable compression plate or spring to align the optical fibers. Various forms of actuated fiber optic connectors utilizing the V-groove alignment concept are disclosed in the following U.S. patents: patent No. 3,885,859 to Dalgleish et al; patent No. 4,030,809 to Onishi et al; and patent No. 4,142,777 to Gauthier et al. The connectors disclosed in these patents require secondary operations to be performed after the mating of the connector halves in order to urge the optical fibers or optical fiber ferrules into the V-grooves.

It is the object of the present invention to provide an axially matable fiber optic connector in which the ferrules in the connector members are automatically urged into the V-groove in one of the connector members upon mating of the members, thus avoiding the necessity of performing a secondary step to actuate the connector to achieve lateral alignment of the optical fibers therein.

SUMMARY OF THE INVENTION

According to the principal aspect of the present invention, there is provided a fiber optic connector comprising first and second axially mating connector members each adapted to carry an optical fiber ferrule. The first connector member has a passage therethrough adapted to receive the ferrules in its opposite ends. The passage includes a pair of longitudinally extending flat sides disposed at an angle relative to each other defining a generally V-shaped channel. Spring means is provided in the passage adapted to be urged toward the channel for biasing the ferrules into the channel to align the optical fibers in the ferrules. Actuating means is carried by the second connector member which is axially slidable relative to the first connector member. The actuating means is operatively associated with the spring means for automatically urging the spring means toward the channel upon mating of the connector members. Thus, only the single step of axially mating the connector halves is required in order to achieve full actuation of the connector and hence alignment of the mating optical fibers therein.

BRIEF DESCRIPTION OF THE DRAWING

FIG. 1 is a partial longitudinal sectional view through the connector of the present invention; and FIG. 2 is a fragmentary front end view of the receptacle connector member illustrated in FIG. 1 showing the spring and one ferrule mounted in the V-shaped channel thereof.

DESCRIPTION OF THE PREFERRED EMBODIMENT

Referring now to the drawing in detail, the connector of the present invention, generally designated 10, comprises a plug connector member 12 and a receptacle connector member 14. The receptacle connector member 14 comprises a generally cylindrical body 16 embodying a wall 18 extending across the body. An axially extending passage 20 extends through the wall 18. The upper portion 22 of the passage 14 has a rectangular cross-section, and the bottom portion 24 of the passage consists of intersecting flat, longitudinally extending sides 24 and 26 defining a V-shaped channel or groove 28.

A generally cylindrical support 30 is mounted in the receptacle body 16 behind the wall 18. A partition 32 extends across the support 30. A central opening 34 in the partition receives therethrough an optical fiber 36 of a fiber optic cable 38 extending into the rear of the receptacle body 16. A retainer 40 is threadly mounted in the forward end of the support 30. An opening 42 extends axially through the retainer in alignment with the opening 34 in the partition 32. A fiber optic ferrule 44 is slidably mounted in the forward portion of the opening 42. A coil spring 46 in the enlarged rear portion of opening 42 engages a flange 48 on the rear of the ferrule 44 urging the ferrule forwardly in the retainer 40. The forward end of the ferrule is slidably mounted in the V-groove 28 in wall 18.

A ring 50 surrounds the cable 38 behind the support 30. The strength member 52 of the cable is folded back over the outer surface of the ring 50 so as to be trapped between the ring and the rear 54 of support 30. An elastomeric moisture seal or grommet 56 surrounds the cable 38 behind ring 50. A cap 58 is threadly engaged on the rear of the body 16 to compress the seal 56 down around the cable 38 and to push the ring 50 forwardly against the support 30 to firmly trap the strength member 52 of the cable therebetween.

A generally W-shaped leaf spring 60 is mounted longitudinally in the rectangular upper portion 22 of the passage 20 in the receptacle body. As seen in FIG. 2, laterally extending tabs 62 on the front of the spring 60 engage the bottom 64 of the recess 66 in the forward portion of the receptacle body 16. The tabs 62 may be secured against the bottom 64 of the recess by welding or the like. The rear of the spring 60 is constrained against rearward movement by engagement with the front 68 of the retainer 40.

The W-shaped leaf spring 60 embodies a forward downwardly extending curved section 70 and a rear downwardly extending curved section 72 interconnected by an upwardly extending central section 74 in the center of the passage 20. When the plug and receptacle connector members are unmated, the spring 60 is in a relaxed position, as shown in phantom lines in FIG. 1, wherein the rear section 72 of the spring is positioned above the ferrule 44 while the forward section 70 is positioned to be located above the fiber optic ferrule 76 of the plug connector member 12 when inserted into the passage 20. A radial bore 78 is provided in the wall 18 extending from the center of passage 20 to the bottom of an annular groove 80 formed in the outer surface of the receptacle body 16. When the spring 60 is in its relaxed position, the central section 74 thereof extends a short distance into the bore 78 as shown in phantom lines in FIG. 1. An actuating plunger 82 is radially slidable in the bore 78. The inner end 84 of the plunger engages the central section 74 of the spring. The upper end 86 of the plunger has a reduced diameter, and extends through an opening 88 formed in a longitudinally slit ring 90 mounted in the groove 80. The ring 90 serves to retain the plunger in the bore 78. An O-ring 92 in an annular groove 94 surrounds the plunger 82 to provide a seal between the plunger and the receptacle body.

The plug connector member 12 comprises a body 96 having a forward end 98 containing a ferrule retainer 100 similar to the support 30 and retainer 40 of the receptacle connector member. The forward end of the body 96 is dimensioned to slide into the recess 66 in the front of the receptacle connector member 14. A strength member retaining ring 102, elastomeric grommet 104 and cap 106 are provided on the rear of the body 96 similar to the receptacle connector member 14. A fiber optic cable 107 passes through the cap 106, grommet 104 and ring 102 and the fiber 108 thereof is connected to ferrule 76. A longitudinally split locking ring 109 is mounted in an annular groove 110 in the outer surface of the body 96. The locking ring embodies three longitudinally spaced annular ridges 112, 114 and 116 each having a forwardly directed bevel. An inwardly extending flange 118 is formed on the front of the receptacle body 16. The forward end of the flange 118 embodies an inner bevel 120.

An axially slidable actuating sleeve 122 is mounted on the plug connector body 96. The sleeve embodies an inwardly extending flange 124 formed with an inner rearwardly facing bevel 126. The forward portion 128 of the actuating sleeve is sufficiently long so that when the connector members 12 and 14 are mated, the sleeve will extend over the actuating plunger 82. The forward inner surface 130 of the forward portion 128 of actuating sleeve 122 is rounded and an annular groove 132 is located behind the surface 130 for engaging the outer end 86 of the plunger.

As the plug and receptacle connector members are initially mated, the forward portion 98 of the plug body 96 slides into the recess 66 in the receptacle body, and the ferrule 76 of the plug connector member slides with zero insertion force into the V-groove 28 of the receptacle. The bevel on the front face of the ridge 112 of locking ring 109 engages the bevel 120 on the receptacle body 16 thereby causing the split ring 108 to contract so that it may pass under the flange 118. After the ridge 112 passes under the flange, the ring 109 expands causing the flange to enter the groove defined between the ridges 112 and 114, thereby locking the plug and receptacle connector members. During this mating operation, the axially slidable actuating sleeve 122 advances over the receptacle body 16 until the curved surface 130 on the forward end of the sleeve cams the plunger 82 radially inwardly. When the connector halves are fully mated, the plunger seats in the groove 132 in the sleeve maintaining the plunger in an inward position in the bore 78 wherein the plunger forces the central section 74 of the spring downwardly toward the V-groove 28, as seen in full lines in FIG. 1, and hence, the curved lower sections 70 and 72 thereof against the ferrules 44 and 76. Thus, upon axial mating of the plug and receptacle connector members 12 and 14, the actuating sleeve 122 cooperates with the plunger 82 to automatically urge the spring 60, and hence the ferrules 44 and 76 into the V-groove to achieve precise lateral alignment of the optical fibers in the ferrules. As a consequence, no secondary operation is required to achieve alignment of the optical fibers in the actuated or zero insertion force connector of the present invention. Also, it will be appreciated that the means for achieving coupling of the receptacle and plug connector members also effects actuation of the fiber optic ferrules in the V-groove of the connector.

When it is desired to disconnect the plug and receptacle connector members, the actuating sleeve 122 is shifted rearwardly whereupon the bevel 126 on the interior of the sleeve cooperates with the bevel on the ridge 116 of the locking ring to cam the ring inwardly, thereby causing it to contract into the groove 110 and allowing the forward ridge 112 of the locking ring to pass under the flange 118 of the receptacle body 16. Retraction of sleeve 122 also allows the spring 60 to return to its normal relaxed position out of engagement with the ferrules 44 and 76 thereby facilitating release of the connector halves.

What is claimed is:

1. A fiber optic connector comprising:
   first and second axially mating connector members each adapted to carry an optical fiber ferrule;
   said first connector member having a passage therethrough adapted to receive the ferrules in its opposite ends;
   said passage including a pair of longitudinally extending flat sides disposed at an angle relative to each other defining a generally V-shaped channel;
   spring means carried by said first connector member and mounted in said passage adapted to be urged toward said channel for biasing the ferrules into said channel to align the optical fibers in the ferrules; and
   actuating means carried by said second connector member axially slidable relative to said first connector member and said spring means, said actuating means being operatively with said spring means for automatically urging said spring means toward said channel upon axial mating of said connector members.

2. A fiber optic connector as set forth in claim 1 wherein:
   said second connector member has coupling means thereon for releasable holding said connector members in mating relationship; and
   said coupling means embodying a portion of said actuating means.

3. A fiber optic connector as set forth in claim 1 wherein:
   said spring means is an elongated leaf spring extending lengthwise in said passage.

4. A fiber optic connector comprising:
   first and second axially mating connector members each adapted to carry an optical fiber ferrule;
   said first connector member having a passage therethrough adapted to receive the ferrules in its opposite ends;
   said passage including a pair of longitudinally extending flat sides disposed at an angle relative to each other defining a generally V-shaped channel;
   spring means mounted in said passage adapted to be urged toward said channel for biasing the ferrules into said channel to align the optical fibers in the ferrules;

actuating means carried by said second connector member axially slidable relative to said first connector member and said spring means, said actuating means being operatively associated with said spring means for automatically urging said spring means toward said channel upon axial mating of said connector members;

said second connector member having coupling means thereon for releasably holding said connector members in mating relationship;

said coupling means embodying a portion of said actuating means;

a transverse bore in said first connector member extending from the wall of said passage opposite to said channel to the exterior of said connector member;

a plunger in said bore having an inner end engaging said spring means and an outer end; and said actuating means engaging said outer end of said plunger upon mating of said connector members.

5. A fiber optic connector as set forth in claim 4 wherein:

said outer end of said plunger extends outside said bore; and said actuating means embodies a cam surface engageable with said outer end.

* * * * *